(12) United States Patent
Namuduri et al.

(10) Patent No.: US 12,308,691 B2
(45) Date of Patent: May 20, 2025

(54) DISCHARGE SYSTEM FOR DC CAPACITORS WITH ACTIVE LOSS CONTROL

(71) Applicant: GM GLOBAL TECHNOLOGY OPERATIONS LLC, Detroit, MI (US)

(72) Inventors: Chandra S. Namuduri, Troy, MI (US); Muhammad Hussain Alvi, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 755 days.

(21) Appl. No.: 17/557,357

(22) Filed: Dec. 21, 2021

(65) Prior Publication Data

US 2023/0198285 A1 Jun. 22, 2023

(51) Int. Cl.
*H02J 7/00* (2006.01)
*H02J 7/34* (2006.01)
*H02P 27/08* (2006.01)

(52) U.S. Cl.
CPC ............ *H02J 7/345* (2013.01); *H02J 7/0063* (2013.01); *H02J 7/00711* (2020.01); *H02J 7/00712* (2020.01); *H02J 2300/24* (2020.01)

(58) Field of Classification Search
CPC ...... H02J 7/345; H02J 7/0063; H02J 7/00711; H02J 7/00712; H02J 2300/24; H02P 27/085
See application file for complete search history.

(56) References Cited

U.S. PATENT DOCUMENTS

| | | | | |
|---|---|---|---|---|
| 9,742,194 | B2* | 8/2017 | Orr | H02S 50/10 |
| 2015/0097501 | A1* | 4/2015 | Yamane | B60L 1/00 |
| | | | | 318/400.3 |
| 2017/0256971 | A1* | 9/2017 | Namou | H02J 7/00306 |
| 2017/0256972 | A1* | 9/2017 | Namou | H02M 7/53875 |
| 2017/0355267 | A1* | 12/2017 | Zhou | B60L 50/10 |

FOREIGN PATENT DOCUMENTS

EP 3820030 A1 5/2021

OTHER PUBLICATIONS

Horowitz et al. The Art of Electronics, 3rd Edition, Errata: Revised Fig 3.113 and Changes to the text on p. 211, published Apr. 2015; URL: https://artofelectronics.net/revisions/revised-fig-3-113.

* cited by examiner

*Primary Examiner* — Nghia M Doan

(57) ABSTRACT

A power control system for a battery system includes a resistor including a first terminal and a second terminal. A normally closed transistor includes a first terminal, a second terminal and a control terminal. The first terminal of the transistor is connected to a second terminal of the resistor and the second terminal of the transistor is connected to a second terminal of the battery system. A capacitor includes a first terminal connected to the first terminal of the resistor and a second terminal connected to the second terminal of the battery system. A power inverter includes a first terminal connected to the first terminal of the resistor, a second terminal connected to the second terminal of the battery system and an output connected to a load.

20 Claims, 8 Drawing Sheets

DISCHARGE SYSTEM FOR DC CAPACITORS WITH ACTIVE LOSS CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery systems of electric vehicles, and more particularly to a discharge system for DC capacitors in power control systems for battery systems of electric vehicles.

Electric vehicles (EVs) such as battery electric vehicles (BEVs), hybrid vehicles, and/or fuel cell vehicles include one or more electric machines and a battery system including one or more battery cells, modules and/or packs. A power control system is used to control charging and/or discharging of the battery system during charging and/or driving. The power control system includes a power inverter module that is arranged between the battery system and the electric machine. The power inverter module typically includes a DC capacitor connected in parallel across an input thereof. During operation of the electric vehicle, the DC capacitor is charged and then the DC capacitor helps the battery system to absorb and release energy during operation.

If the EV is shut down without discharging, the DC capacitor can become an uncontrolled source of energy. In some applications, a discharge resistor is connected in parallel across the DC capacitor. The discharge resistor operates passively and is sized to reduce DC bus voltage during a predetermined period after operation of the EV ends. Traditional systems size the capacitors to provide a balance of safe discharge time and continuous power loss.

For example, the discharge resistor can reduce the voltage across the capacitor from 800V to under 50V in around 1 minute. However, during operation, the discharge resistor is constantly drawing current and discharging the DC capacitor, which is not efficient. The discharge resistor causes a continuous loss of about 15 W during operation, which leads to a loss of tens of kilowatt hours (kW-H) over the life of the EVs.

SUMMARY

A power control system for a battery system includes a resistor including a first terminal and a second terminal. A normally closed transistor includes a first terminal, a second terminal and a control terminal. The first terminal of the transistor is connected to a second terminal of the resistor and the second terminal of the transistor is connected to a second terminal of the battery system. A capacitor includes a first terminal connected to the first terminal of the resistor and a second terminal connected to the second terminal of the battery system. A power inverter includes a first terminal connected to the first terminal of the resistor, a second terminal connected to the second terminal of the battery system and an output connected to a load.

In other features, the resistor includes a first terminal in electrical connection with a first terminal of the battery system. A contactor includes a first terminal connected to the first terminal of the battery system, wherein the resistor includes a first terminal connected to a second terminal of the contactor. The transistor is normally-closed. The transistor is a depletion mode field effect transistor (dep-FET), In other features, a controller is configured to supply a control signal to turn on the transistor to open the transistor in response to operation of a vehicle including the battery system. An isolated driver connected between the controller and the control terminal of the transistor. A gate driver bias power supply supplies power to the isolated driver. The gate bias driver supplies power to at least one switch in the power inverter module.

In other features, comprising a photo-voltaic driver connected between the controller and the control terminal of the transistor. The controller is configured to use a common control signal to drive both the transistor and a battery contactor. The controller is configured to selectively control the transistor using pulse width modulation during operation in response to a voltage across the capacitor.

A method to control discharge in a power control system for a battery system comprises providing a resistor including a first terminal and a second terminal; connecting a first terminal of a normally closed transistor to a second terminal of the resistor and a second terminal of the transistor to a second terminal of the battery system; connecting a first terminal of a capacitor to the first terminal of the resistor and a second terminal of the capacitor to the second terminal of the battery system; and connecting a first terminal of a power inverter to the first terminal of the resistor, a second terminal of the power inverter to the second terminal of the battery system and an output connected to a load.

In other features, the resistor includes a first terminal in communication with a first terminal of the battery system. The method includes connecting a first terminal of a contactor to the first terminal of the battery system; and connecting the first terminal of the resistor to a second terminal of the contactor. The transistor is normally-closed. The transistor is a depletion mode field effect transistor (dep-FET), In other features, the method includes supplying a control signal to turn on the transistor to open the transistor in response to operation of a vehicle including the battery system.

In other features, the method includes isolating a control terminal of the transistor. The method includes selectively turning off the transistor during operation to close the transistor and discharge the capacitor in response to a voltage across the capacitor. The method includes using a common control signal to drive both the transistor and a battery contactor. The method includes selectively controlling the transistor using pulse width modulation during operation in response to a voltage across the capacitor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A-7 are functional block diagrams and electrical schematics of additional examples of power control systems for a battery system including a discharge resistor and transistor that selectively discharge the DC capacitor according to the present disclosure.

In the drawings, reference numbers may be reused to identify similar and/or identical elements.

DETAILED DESCRIPTION

While the power control system according to the present disclosure is described in the context of an electric vehicle (EV), the power control system described herein can be used in other vehicle applications or in other non-vehicular applications.

The power control system according to the present disclosure includes a discharge system that eliminates or reduces high voltage (HV) capacitor discharge loss in a discharge resistor by selectively blocking discharge during operation of the EV. The power control system with the discharge system meets safe voltage requirements by allowing discharge current during passive conditions (e.g. when the EV is not operating).

In some examples, the power control system according to the present disclosure includes a depletion mode field effect transistor (dep-FET) which is normally ON. Use of the normally ON transistor enables capacitor discharge in controlled situations as well as in uncontrolled situations (e.g. in the absence of a control input).

Figure 1:
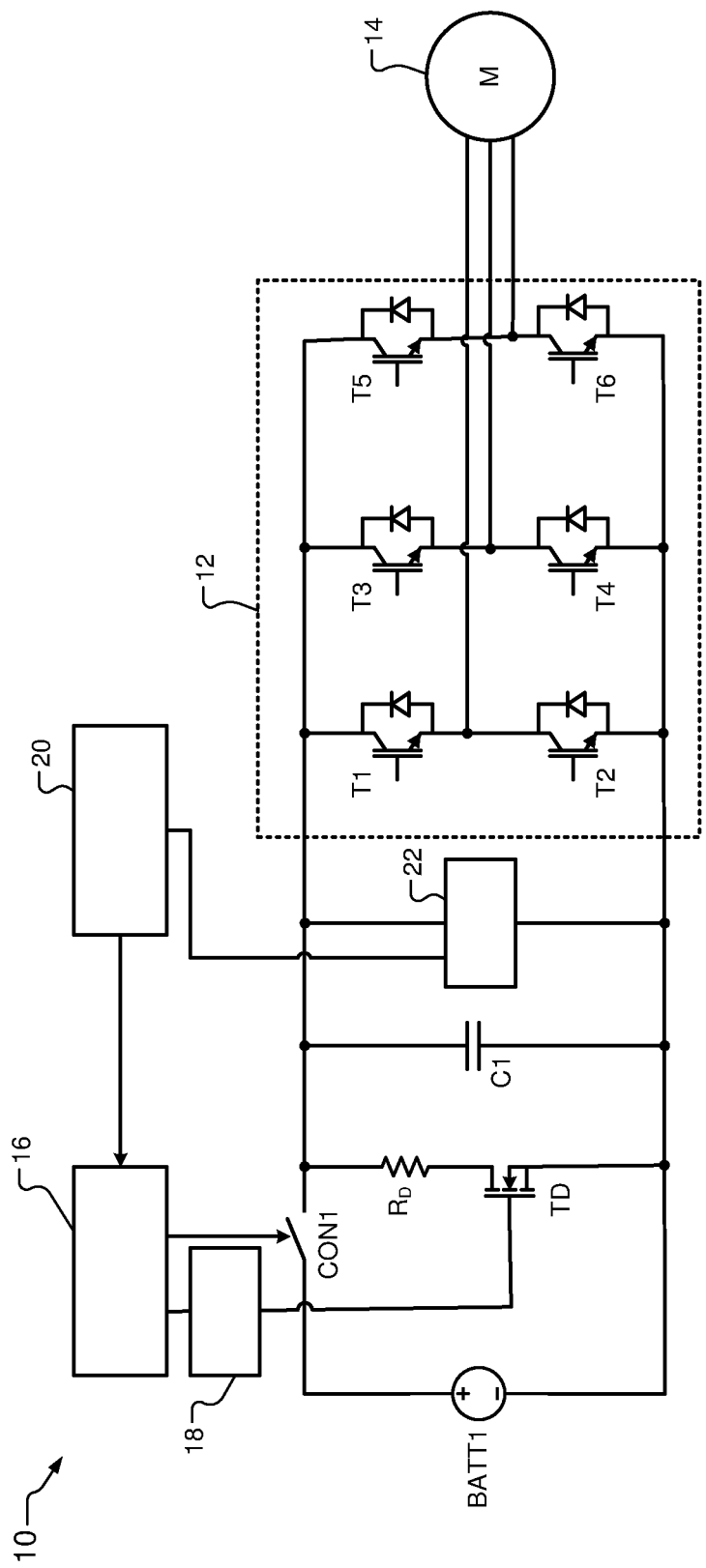
FIG. 1 is a functional block diagram and electrical schematic of a power control system for a battery system including a discharge resistor and a transistor that selectively discharge a DC capacitor according to the present disclosure.

Referring now to FIG. 1, a power control system 10 for a battery system is shown. The power control system 10 controls power supplied by a battery system BATT1 to a load such as an electric machine 14 of a vehicle, although other types of loads can be used.

The battery system BATT1 includes one or more battery cells, modules, and/or packs. For example, the battery system may include B battery cells, M modules (including one or more battery cells) and/or P packs (including one or more modules), where B and M are integers greater than one and P is an integer greater than zero. The power control system 10 includes a contactor CON1 having a first terminal connected to one terminal of the battery system BATT1. A controller 16 may be used to control operation of the contactor CON1. In some examples, the contactor CON1 comprises a power switch, a mechanical contactor and/or a solid state relay.

The power control system 10 includes a power inverter 12. A second terminal of the contactor CON1 is connected to a first terminal of the power inverter 12 and a first terminal of a capacitor C1. A second terminal of the power inverter 12 is connected to second terminals of the capacitor C1 and the battery system BATT1.

The power inverter 12 includes power switches T1, T2, T3, T4, T5 and T6. First terminals of power switches T1, T3 and T5 are connected to a first terminal of the capacitor C1. Second terminals of the power switches T1, T3 and T5 are connected to first, second and third phases of the electric machine 14, respectively, and to first terminals of the power switches T2, T4 and T6, respectively. Second terminals of the power switches T2, T4 and T6 are connected to the second terminals of the capacitor C1.

A discharge resistor $R_D$ includes a first terminal connected to a second terminal of the contactor CON1, the first terminal of the capacitor C1 and the first terminal of the power inverter 12. A second terminal of the discharge resistor $R_D$ is connected to a first terminal of a transistor $T_D$ including a control terminal, the first and a second terminal). In some examples, the transistor $T_D$ is normally-closed. In other words, the transistor $T_D$ is conducting in the absence of a signal to the control terminal. When a signal is supplied to the control terminal, the transistor $T_D$ transitions to non-conducting or open.

Once operation of the drive system is initiated, a signal is supplied to the control terminal of the transistor $T_D$ to cause the transistor $T_D$ to stop conducting. When operation of the drive system ends, the signal is stopped and the signal supplied to the control terminal of the transistor $T_D$ is stopped to cause the transistor $T_D$ to conduct and discharge the capacitor C1 through the discharge resistor $R_D$.

During operation of the drive system, the transistor $T_D$ is not conducting to reduce power loss. When operation ends, the drive signal to the control terminal of the transistor $T_D$ ends and the transistor $T_D$ conducts to dissipate power in the capacitor C1.

In some examples, the transistor $T_D$ is turned on and off during operation of the vehicle using a pulse width modulated signal (PWM) in response to certain conditions or turned on for a predetermined period during operation to discharge the capacitor C1 and then turned off. For example, the power control system may have a fault that causes the capacitor C1 to be charged to a voltage above a predetermined voltage threshold. In some examples, a voltage sensor 22 senses a voltage across the capacitor C1.

For example, excessive charge can occur after a regeneration event, other fault events, or other non-fault events. In response to excessive voltage, the power control system discharges the capacitor using a PWM signal until the fault clears or is cleared. In other examples, the power control system may switch the transistor $T_D$ on for the duration of the drive cycle, for one or more predetermined periods or for a calculated period based on a difference between the measured voltage and the predetermined voltage threshold.

In the example in FIG. 1, the drive signal for the transistor $T_D$ is supplied by a controller 16 or another circuit. In some examples, the controller 16 also controls the contactor CON1. In some examples, the controller 16 outputs a signal to an isolated driver 18, which in turn drives the control terminal of the transistor $T_D$. In other examples, the controller 16 directly controls the transistor $T_D$. In some examples, the controller 16 communicates with another controller 20. The controller 20 sends an operating mode of the EV to the controller 16, a fault code, or a control signal to cause the controller 16 to turn on the transistor $T_D$. For example, the operating mode may include a limp home mode in response to a regeneration fault or other power control system fault causing excess voltage on the capacitor C1.

Figure 2A:
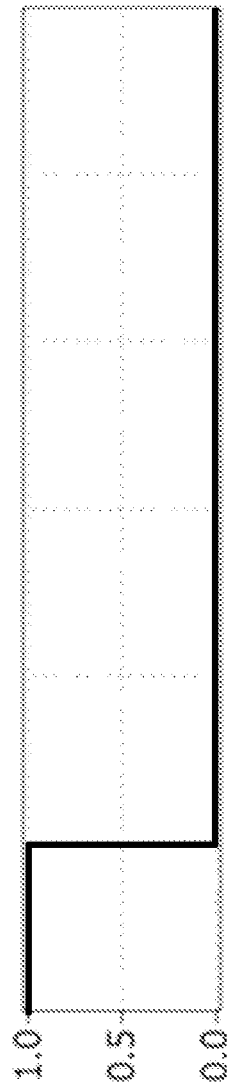
FIG. 2A-2C are graphs illustrating operation of an example of a power control system including a discharge resistor that discharges a DC capacitor according to the prior art.
Figure 2B:
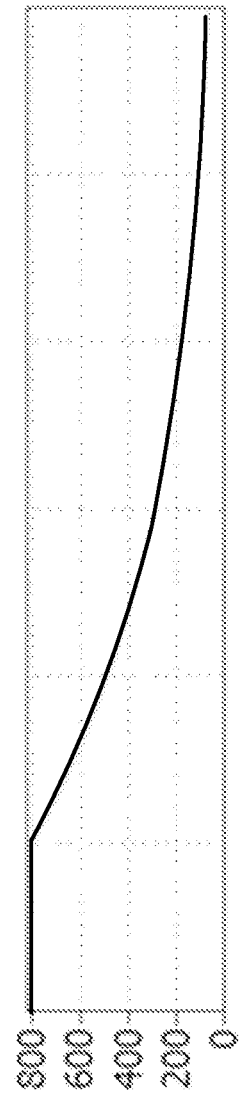
Figure 2C:
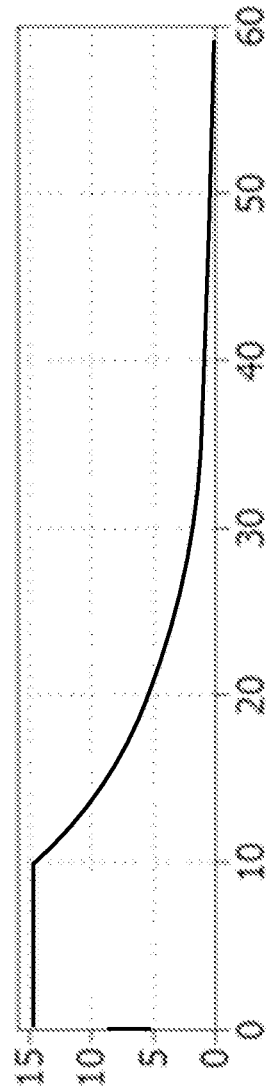
Figure 3A:
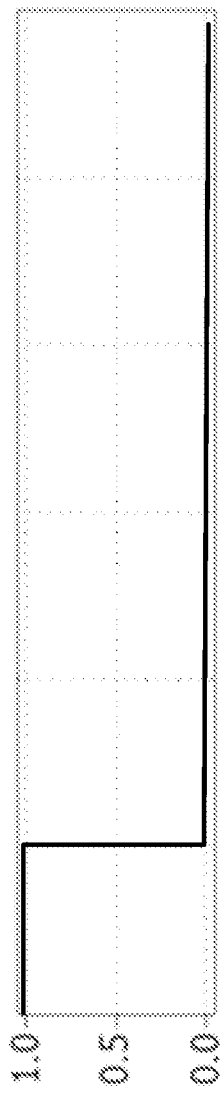
FIG. 3A-3D are graphs illustrating operation of the power control system of FIG. 1.
Figure 3B:
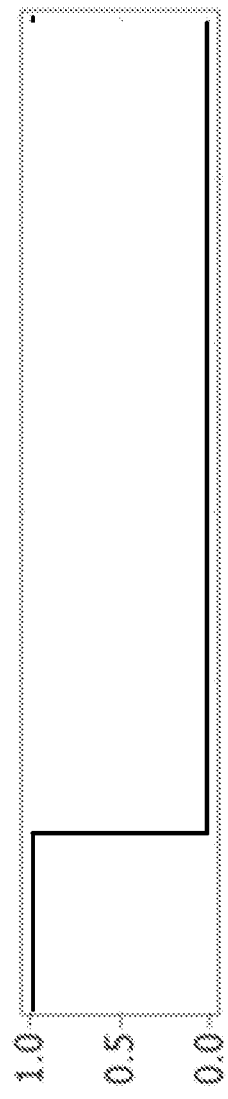
Figure 3C:
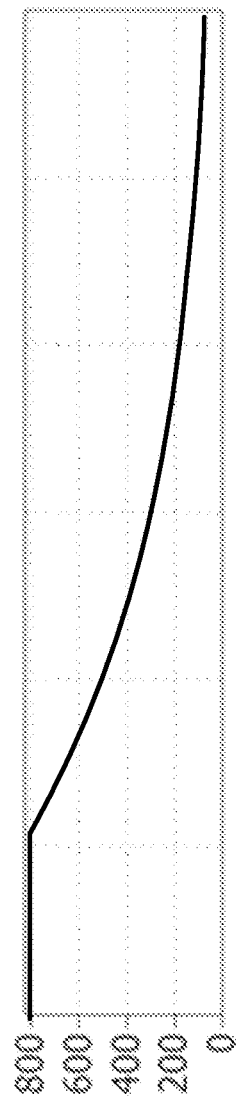
Figure 3D:
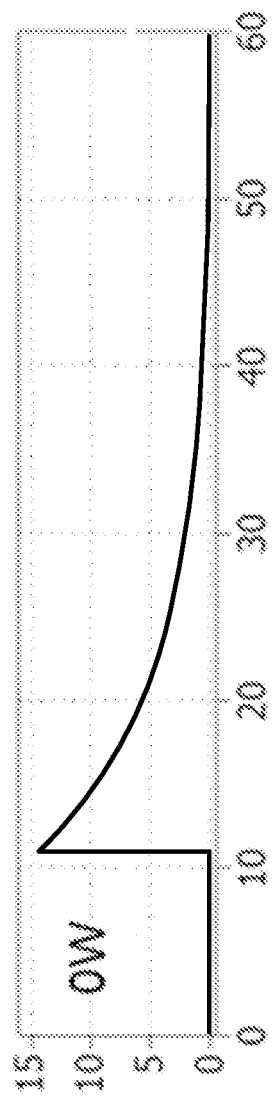

Referring now to FIGS. 2A-2C, graphs showing operation of a power control system including a discharge resistor connected in parallel to the capacitor C1 at the input of the power inverter (without the transistor $T_D$ as shown in FIG. 1). In other words, the discharge resistor $R_D$ is always connected in parallel to the capacitor C1 and cannot be disconnected.

In this example, power is dissipated when the power system is disabled and also when the drive system is enabled (e.g. during operation (shown as a period from 0 s to 10 s during which the battery contactor is enabled)). As can be appreciated, the drive system is usually enabled during operation for longer periods than 10 s. When the drive system is disabled, the capacitor voltage across the capacitor C1 is discharged by the discharge resistor $R_D$ and power is dissipated in discharge resistor $R_D$. A very high $R_D$ would reduce the continuous power loss but would not meet the safety requirements to discharge the capacitor in designated time.

Referring now to FIGS. 3A-3D, graphs showing operation of a power control system including a discharge resistor connected in parallel to the capacitor C1 at the input of the power inverter 12 is shown. In this example, the transistor $T_D$ is open (and non-conductive) and power is not dissipated by the discharge resistor $R_D$ when the drive system is enabled (e.g. during vehicle operation). When the drive system is disabled, voltage across the capacitor C1 is discharged by the discharge resistor $R_D$ and power is dissipated in discharge resistor $R_D$. Comparing FIGS. 2C and 3D, it is apparent that less power is dissipated by the discharge resistor $R_D$ in FIG. 3C during operation of the EV.

Figures 4A, 4B:
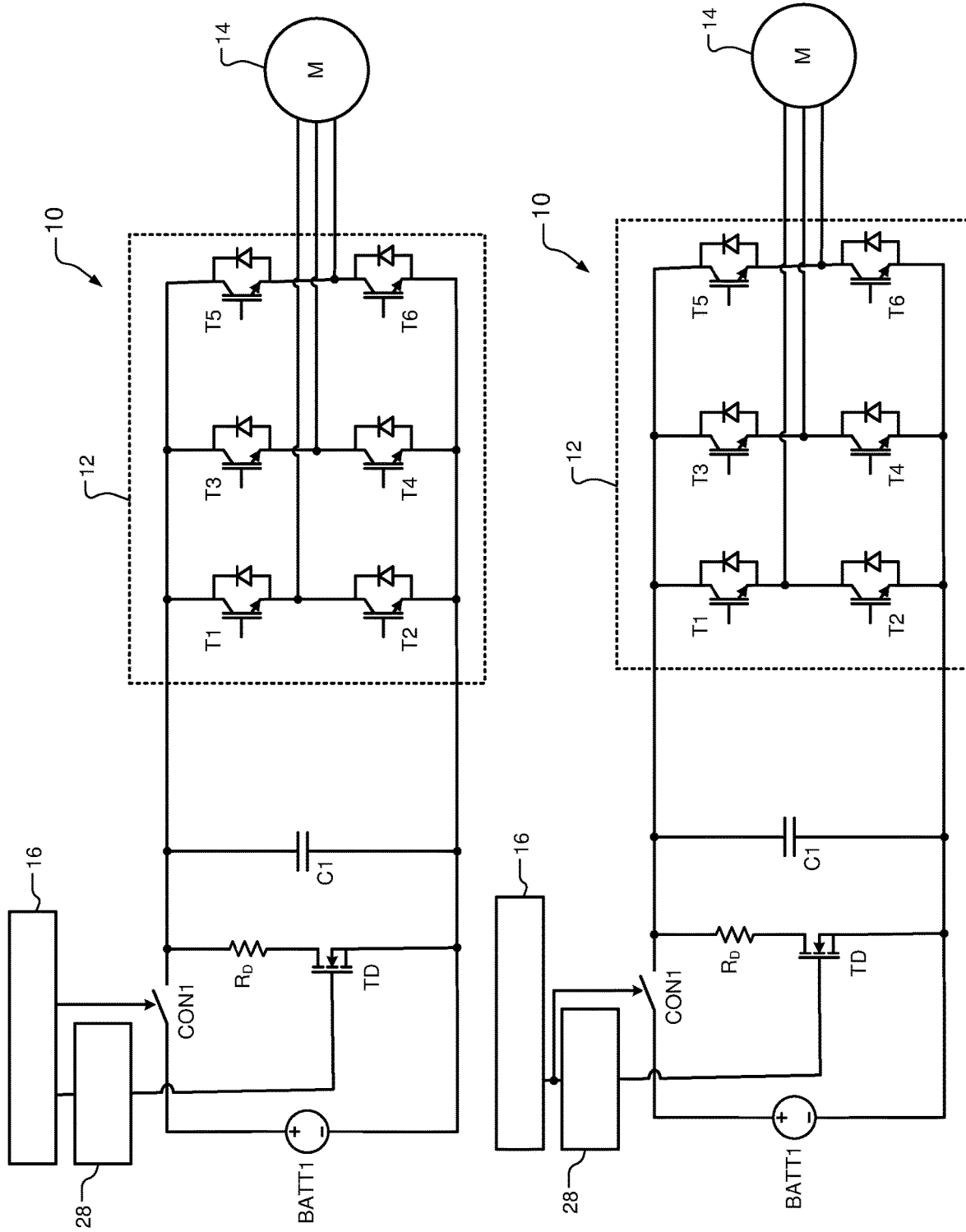

Referring now to FIGS. 4A-7, other variations for controlling the transistor T1 are shown. In FIG. 4A, the controller 16 outputs drive signals to a photo-voltaic gate driver 28 and the contactor CON1, although another controller may be used to control the contactor CON1. In some examples, the photo-voltaic gate driver 28 includes a diode outputting light to a photodetector. In FIG. 4B, the controller 16 outputs a common drive signal to both the photo-voltaic gate driver 28 and the contactor CON1. This approach can be used for other circuits described herein.

Figure 5:
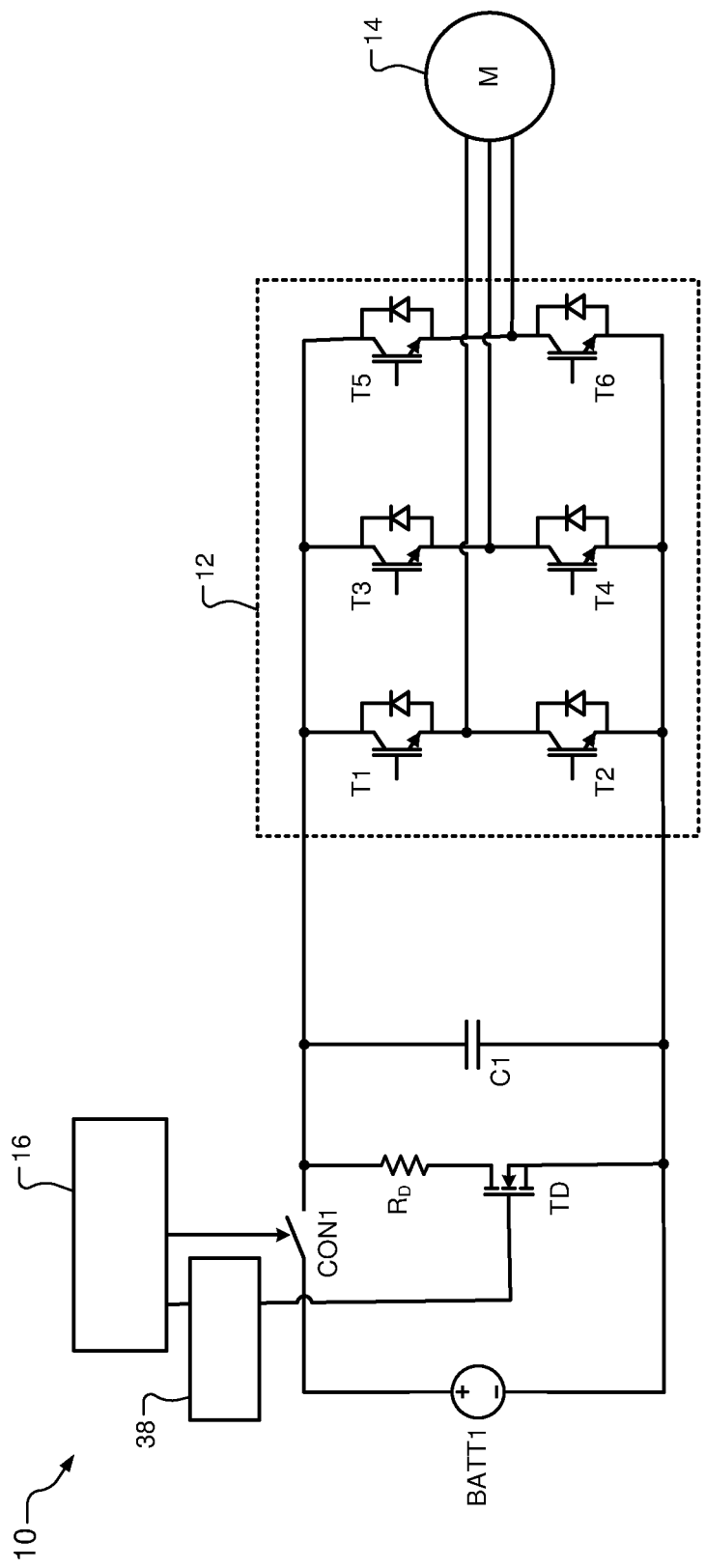

In FIG. 5, the controller 16 outputs a drive signal to a pulse transformer 38 and to the contactor CON1. In some examples, the controller 16 generates separate signals or another controller generates one of the signals. In other examples, the same signal can be used as shown.

Figure 6:
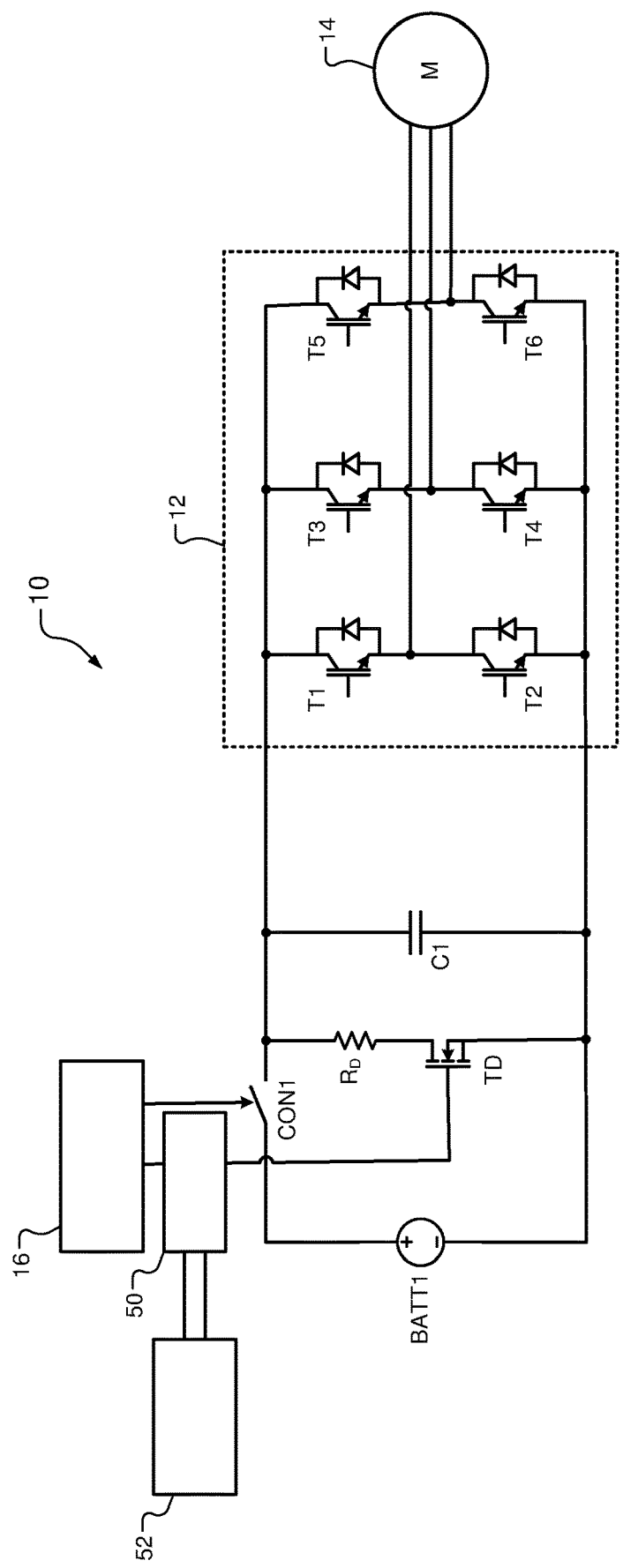

In FIG. 6, the controller 16 outputs a drive signal to an isolated gate driver 50. A gate driver bias power supply 52 provides power to the isolated gate driver 50.

Figure 7:
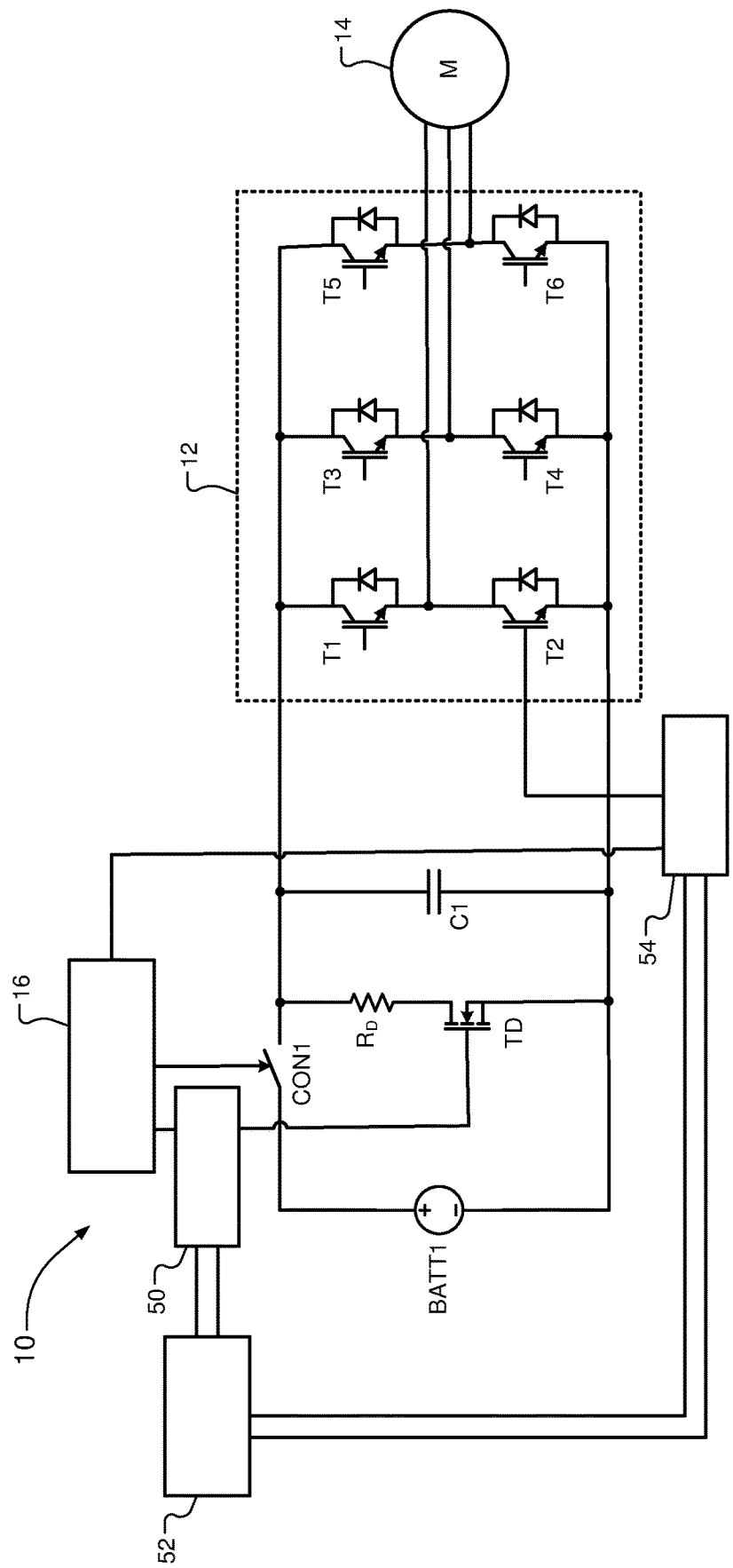

In FIG. 7, the gate driver bias power supply 52 also provides power to an isolated gate driver 54 that controls the transistor T2 of the power inverter 12. Bias supply of T2, T4 or T6 can be used.

In some examples, the transistor $T_D$ includes a low current, depletion mode normally-on field effect transistor (FET) (D-FET). In some examples, the transistor $T_D$ includes a low current, high voltage device. These types of transistors are low cost. In some examples, low current corresponds to current that is less than or equal to 1 A and high voltage corresponds to voltage that is greater than or equal to 350V.

During the operation of the vehicle, the transistor $T_D$ is actively turned off to avoid discharge current and loss during operation of the EV. As shown in FIG. 5, the contactor enable signal can be used in various implementations to disconnect the discharge resistor $R_D$. When the contactor CON1 opens, the transistor $T_D$ is also turned on to start discharging of the discharge resistor $R_D$.

The power control system with the passive discharge system enables passive discharge for a HV capacitor. The passive discharge system is self-activating even with loss of control such as a vehicle crash since the transistor is normally ON. Furthermore, the power dissipation can be selectively reduced by supplying a control signal to an input of the transistor.

Figure 8:
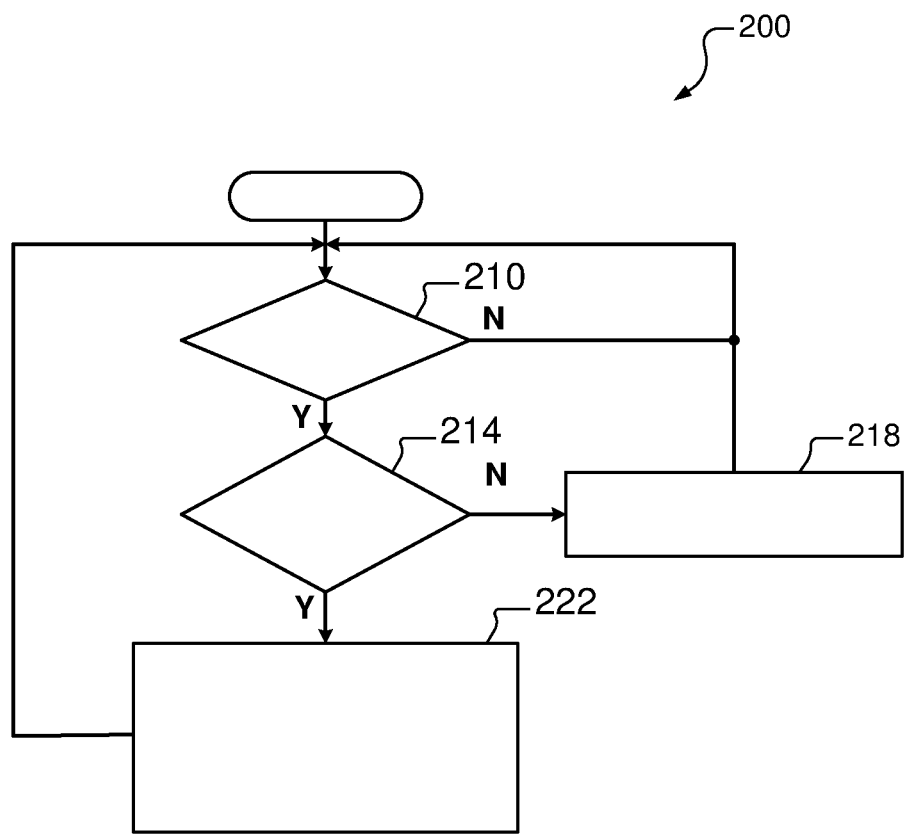
FIG. 8 is a flowchart of an example of a method for selectively discharging the capacitor during operation in response to increased voltage across the capacitor or other operating conditions according to the present disclosure.

Referring now to FIG. 8, the transistor $T_D$ can also be turned ON for predetermined periods or modulated ON and OFF during certain operating modes of the vehicle using pulse width modulation (PWM). For example, voltage across the capacitor C1 can be monitored by a voltage sensor 22. In response, to detecting excess voltage across the capacitor C1 (such as in response to a fault occurring during a regeneration event or other operating conditions causing excess voltage on the capacitor), the controller 20 (or the controller 16) turns the transistor $T_D$ ON for one or more predetermined periods during operation, turns the transistor $T_D$ ON for the drive cycle (until key off) and/or to drives the transistor $T_D$ ON and OFF using a PWM signal.

In FIG. 8, a method 200 for controlling discharge of the capacitor C1 is shown. At 210, the method determines whether the vehicle is operating (e.g. key on). If 210 is true, the method determines whether the capacitor C1 requires discharge at 214. If 214 is false, the method continues at 216 and the signal is supplied to the control terminal of the transistor $T_D$ and control returns to 210. In other words, the default operation is to not discharge the capacitor C1 during operation of the vehicle. If 214 is true, the method continues at 222 and controls the control terminal using PWM for a predetermined period, for the current drive cycle, until a fault is reset, until the voltage across the capacitor falls below the predetermined voltage, or other criteria. In other examples, the method supplies the signal to the control terminal of the transistor $T_D$ (for a predetermined period, for the current drive cycle, until a fault is reset, until the voltage across the capacitor falls below the predetermined voltage, or other criteria) and then turns the transistor $T_D$ off.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system for a battery system, comprising:
   a resistor including a first terminal and a second terminal;
   a normally closed transistor including a first terminal, a second terminal and a control terminal, wherein the first terminal of the transistor is connected to the second terminal of the resistor and the second terminal of the transistor is connected to a second terminal of the battery system;
   a capacitor including a first terminal connected to the first terminal of the resistor and a second terminal connected to the second terminal of the battery system;
   a power inverter including a first terminal connected to the first terminal of the resistor, a second terminal connected to the second terminal of the battery system and an output connected to a load; and
   a controller configured to supply a control signal to the control terminal of the transistor to turn on the transistor to open the transistor in response to operation of a vehicle including the battery system and control the transistor using pulse width modulation during operation of the vehicle.

2. The power control system of claim 1, wherein the first terminal of the resistor is in electrical connection with a first terminal of the battery system.

3. The power control system of claim 1, further comprising a contactor including a first terminal connected to the first terminal of the battery system, wherein the first terminal of the resistor is connected to a second terminal of the contactor.

4. The power control system of claim 1, wherein the transistor is a depletion mode field effect transistor (dep-FET).

5. The power control system of claim 1, further comprising:
an isolated driver connected between the controller and the control terminal of the transistor; and
a gate driver bias power supply to supply power to the isolated driver, wherein the gate driver bias power supply supplies power to at least one switch in the power inverter.

6. The power control system of claim 1, further comprising a photo-voltaic driver connected between the controller and the control terminal of the transistor.

7. The power control system of claim 1, wherein the controller is configured to use a common control signal to drive both the transistor and a battery contactor.

8. The power control system of claim 1, wherein the controller is configured to control the transistor in response to a voltage across the capacitor.

9. The power control system of claim 1, wherein the controller is configured to control the transistor to turn on in response to a voltage across the capacitor exceeding a predetermined voltage threshold and use pulse width modulation until the voltage across the capacitor falls below the predetermined voltage threshold.

10. A method to control discharge in a power control system for a battery system, comprising:
providing a resistor including a first terminal and a second terminal;
connecting a first terminal of a normally closed transistor to a second terminal of the resistor and a second terminal of the transistor to a second terminal of the battery system;
connecting a first terminal of a capacitor to the first terminal of the resistor and a second terminal of the capacitor to the second terminal of the battery system; and
connecting a first terminal of a power inverter to the first terminal of the resistor, a second terminal of the power inverter to the second terminal of the battery system and an output connected to a load
supplying a control signal to turn on the transistor to open the transistor in response to operation of a vehicle including the battery system; and
controlling the transistor using pulse width modulation during operation of the vehicle.

11. The method of claim 10, further comprising connecting the first terminal of the resistor to a first terminal of the battery system.

12. The method of claim 10, further comprising:
connecting a first terminal of a contactor to a first terminal of the battery system; and
connecting the first terminal of the resistor to a second terminal of the contactor.

13. The method of claim 10, wherein the transistor is a depletion mode field effect transistor (dep-FET).

14. The method of claim 10, wherein the control signal drives both the transistor and a battery contactor.

15. The method of claim 10, further comprising isolating a control terminal of the transistor.

16. The method of claim 10, further comprising turning off the transistor during operation to close the transistor and discharge the capacitor in response to a voltage across the capacitor.

17. The method of claim 10, wherein controlling the transistor using pulse width modulation during operation includes controlling the transistor in response to a voltage across the capacitor.

18. A power control system for a battery system, comprising:
a contactor including a first terminal connected to a first terminal of the battery system;
a resistor including a first terminal and a second terminal, the first terminal of the resistor connected to a second terminal of the contactor;
a normally-closed transistor including a first terminal, a second terminal and a control terminal,
wherein the first terminal of the normally-closed transistor is connected to the second terminal of the resistor and the second terminal of the normally-closed transistor is connected to a second terminal of the battery system;
a capacitor including a first terminal connected to the first terminal of the resistor and a second terminal connected to the second terminal of the battery system;
a power inverter including a first terminal connected to the first terminal of the resistor, a second terminal connected to the second terminal of the battery system and an output connected to a load; and
a controller configured to supply a control signal to the control terminal of the transistor to turn on the normally-closed transistor to open the normally-closed transistor in response to operation of a vehicle including the battery system and control the transistor using pulse width modulation during operation of the vehicle.

19. The power control system of claim 18, wherein the controller is configured to control the transistor to turn on for a period during operation.

20. The power control system of claim 19, wherein the period is based on a difference between a measured voltage across the capacitor and a predetermined voltage threshold.

* * * * *